United States Patent
Fukami et al.

(10) Patent No.: US 8,077,645 B2
(45) Date of Patent: Dec. 13, 2011

(54) WIRELESS COMMUNICATION TERMINAL, SEMICONDUCTOR DEVICE, DATA COMMUNICATION METHOD, AND WIRELESS COMMUNICATION SYSTEM

(75) Inventors: Tadashi Fukami, Kanagawa (JP); Akira Endo, Saitama (JP)

(73) Assignee: Sony Corporation, Tokyo (JP)

( * ) Notice: Subject to any disclaimer, the term of this patent is extended or adjusted under 35 U.S.C. 154(b) by 881 days.

(21) Appl. No.: 12/105,775

(22) Filed: Apr. 18, 2008

(65) Prior Publication Data

US 2009/0323645 A1 Dec. 31, 2009

(30) Foreign Application Priority Data

May 11, 2007 (JP) ................................ 2007-127216

(51) Int. Cl.
*H04B 7/00* (2006.01)
(52) U.S. Cl. ...................................................... 370/310
(58) Field of Classification Search .................. None
See application file for complete search history.

(56) References Cited

U.S. PATENT DOCUMENTS

| 5,789,953 | A | * | 8/1998 | Au et al. | .......... 327/116 |
| 2005/0108482 | A1 | | 5/2005 | Fuks | |
| 2008/0139212 | A1 | * | 6/2008 | Chen et al. | .......... 455/450 |

FOREIGN PATENT DOCUMENTS

| JP | 2003-502900 | 1/2003 |
| JP | 2005-518042 | 6/2005 |
| JP | 2006-166311 | 6/2006 |
| JP | 2006-287767 | 10/2006 |
| WO | 00/77940 A1 | 12/2000 |

OTHER PUBLICATIONS

Japanese Office Action issued Aug. 23, 2011, for corresponding Japanese Appln. No. 2007-127216.

* cited by examiner

*Primary Examiner* — Raj Jain
(74) *Attorney, Agent, or Firm* — K&L Gates LLP

(57) ABSTRACT

A wireless communication terminal is provided. The wireless communication terminal including a first wireless communication section configured to operate in a first clock system; a second wireless communication section configured to operate in a second clock system different from the first clock system, and perform short-range wireless communication; and an asynchronous interface that mediates between the first wireless communication section and the second wireless communication section.

4 Claims, 12 Drawing Sheets

FIG. 3

| UART SPEED SETTING | | | | | |
|---|---|---|---|---|---|
| 0x1F | 7:5 | BR_T0 | 3 | r/w | 4'hE | SRST |
| | 4:0 | BR_T1 | 5 | r/w | 4'hB | SRST |

Columns: NUMBER OF BITS, TYPE, INITIAL VALUE, SOFT RESET ENABLED

9600:0xEB, 115200:0x7A

FIG. 11

| TRANSMISSION MODE SETTING | | NUMBER OF BITS | | TYPE | INITIAL VALUE | SOFT RESET ENABLED | CRC GENERATION ENABLE AT THE TIME OF DATA TRANSMISSION |
|---|---|---|---|---|---|---|---|
| 0x12 | 7 | TxCRCEn | 1 | dy | 1'b1 | SRST | |
| | 6:4 | TxSpeed | 3 | dy | 3'b001 (212kb/s) | SRST | 000:106K, 001:212K, 010:424K, 011:848K |
| | 3 | | | | | | |
| | 2 | | | | | | |
| | 1:0 | TxFraming | 2 | dy | 2'b00 (Mifare) | SRST | 00:MIFARE, 01:Active Communication Mode, 10:FeliCa, 11:TypeB |

WIRELESS COMMUNICATION TERMINAL, SEMICONDUCTOR DEVICE, DATA COMMUNICATION METHOD, AND WIRELESS COMMUNICATION SYSTEM

CROSS REFERENCES TO RELATED APPLICATIONS

The present application claims priority to Japan Patent Application JP 2007-127216, filed in the Japanese Patent Office on May 11, 2007, the entire contents of which being incorporated herein by reference.

BACKGROUND

The present application relates to a wireless communication terminal, a semiconductor device, a data communication method, and a wireless communication system which can be suitably applied to a wireless local area network (LAN) system, for example. In particular, the present invention relates to a wireless communication terminal and so on in which a first wireless communication section, which operates in a first clock system, and a second wireless communication section, which operates in a second clock system and performs short-range wireless communication, are connected to each other via an asynchronous interface, so that the first and second wireless communication sections can be formed within a single chip.

Wireless communication terminals that have a wireless LAN communication section and a short-range wireless communication section have already been proposed. For example, Japanese Patent Laid-Open No. 2006-166311 describes a wireless communication terminal having a wireless LAN communication section and a short-range wireless communication section, and which performs communication setting for a wireless LAN based on wireless LAN setting information acquired via the short-range wireless communication section.

SUMMARY

In the wireless communication terminal having the wireless LAN communication section and the short-range wireless communication section, forming the wireless LAN communication section and the short-range wireless communication section with independent chips (i.e., independent semiconductor integrated circuits) is disadvantageous in terms of costs, power consumption, and space. It is conceivable to form both the wireless LAN communication section and the short-range wireless communication section within a single chip to overcome the above disadvantage. However, in the case where the wireless LAN communication section and the short-range wireless communication section operate in different clock systems, some ingenuity is desired at a place where the wireless LAN communication section and the short-range wireless communication section are connected to each other.

An advantage of the present application is to allow the first wireless communication section and the second wireless communication section, which performs the short-range wireless communication, to be formed within a single chip.

According to one embodiment, there is provided a wireless communication terminal including: a first wireless communication section configured to operate in a first clock system; a second wireless communication section configured to operate in a second clock system different from the first clock system, and perform short-range wireless communication; and an asynchronous interface that mediates between the first wireless communication section and the second wireless communication section.

In the wireless communication terminal, the first wireless communication section operates in the first clock system, while the second wireless communication section, which performs short-range wireless communication, operates in the second clock system. The first wireless communication section may be a wireless LAN communication section, for example. The second wireless communication section may be a communication section for near field communication (NFC), for example.

The first wireless communication section and the second wireless communication section are connected to each other via the asynchronous interface. This asynchronous interface reconciles a difference in clock system between the first wireless communication section and the second wireless communication section. The first wireless communication section may include an internal CPU and a CPU bus, and the second wireless communication section may be connected to the CPU bus in the first wireless communication section via the asynchronous interface.

The asynchronous interface may include: a first memory element accessible by the first wireless communication section in synchronism with the first clock system; and a second memory element accessible by the second wireless communication section in synchronism with the second clock system. The first and second memory elements are formed by a register or a random access memory (RAM), for example.

Since the asynchronous interface mediates between the first wireless communication section and the second wireless communication section as described above, the first wireless communication section and the second wireless communication section can be formed within a single chip, leading to advantages in terms of costs, power consumption, and space.

In the case where the first wireless communication section is connected to the second wireless communication section via the asynchronous interface as described above, the first wireless communication section is able to output predetermined data to an outside via the second wireless communication section. Here, the predetermined data may be setup information for a wireless communication section or the like, for example. In this case, the first wireless communication section is able to supply the setup information necessary for another wireless communication section that performs wireless communication with the first wireless communication section to the other wireless communication section via the second wireless communication section.

Also, in the case where the first wireless communication section is connected to the second wireless communication section via the asynchronous interface as described above, the first wireless communication section is able to acquire predetermined data from an outside via the second wireless communication section. The predetermined data may be setup information for the first wireless communication section, for example. In this case, the setup information is supplied to the first wireless communication section via the second wireless communication section, and a setup (an initial setting) for the first wireless communication section can be performed easily and in a short time.

Also, the predetermined data may be a circuit parameter for the first wireless communication section, for example. In this case, the circuit parameter is supplied to the first wireless communication section via the second wireless communication section, and setting of the circuit parameter in the first wireless communication section can be performed easily. Also, the predetermined data may be billing information, for example. In this case, the first wireless communication section is able to acquire the billing information, which is to be sent to a billing server, via the second wireless communication section easily.

Also, the first wireless communication section may include an internal CPU and a CPU bus, and the second wireless communication section may be connected to the CPU bus via the asynchronous interface. In this case, the internal CPU of the first wireless communication section is able to access a storage section (e.g., a register or memory) in the second wireless communication section via the asynchronous interface. The internal CPU may supply an address to be accessed of the storage section in the second wireless communication section via a data bus of the CPU bus, for example.

In this case, storage sections within the second wireless communication section are not developed in parallel on an address space of the internal CPU. Instead, the second wireless communication section occupies only one address, leading to easy porting.

According to another embodiment, there is provided a semiconductor device including: a first wireless communication section configured to operate in a first clock system; a second wireless communication section configured to operate in a second clock system different from the first clock system, and perform short-range wireless communication; and an asynchronous interface that mediates between the first wireless communication section and the second wireless communication section.

According to yet another embodiment, there is provided a method of communicating data between a first wireless communication section that operates in a first clock system and a second wireless communication section that operates in a second clock system different from the first clock system and which performs short-range wireless communication, wherein the data is communicated between the first wireless communication section and the second wireless communication section via an asynchronous interface that mediates between the first wireless communication section and the second wireless communication section.

According to yet another embodiment, there is provided a wireless communication system including a first wireless communication terminal and a second wireless communication terminal. The first wireless communication terminal includes: a first wireless communication section configured to operate in a first clock system; a first asynchronous interface; and a second wireless communication section configured to operate in a second clock system different from the first clock system, and perform short-range wireless communication. The second wireless communication section is connected to the first wireless communication section via the first asynchronous interface. The first and second wireless communication sections are formed within a single chip. The second wireless communication terminal includes: a third wireless communication section configured to operate in the first clock system; a second asynchronous interface; and a fourth wireless communication section configured to operate in the second clock system different from the first clock system, and perform short-range wireless communication. The fourth wireless communication section is connected to the third wireless communication section via the second asynchronous interface. The third and fourth wireless communication sections are formed within a single chip. The first wireless communication section in the first wireless communication terminal outputs setup information via the second wireless communication section. The third wireless communication section in the second wireless communication terminal acquires the setup information outputted from the second wireless communication section in the first wireless communication terminal via the fourth wireless communication section to perform a setup based on the setup information.

According to yet another embodiment, there is provided a wireless communication system including: a content server; a billing server; a network; a first wireless communication terminal connected to the content server and the billing server via the network; and a second wireless communication terminal connected to the first wireless communication terminal in a wireless manner. The second wireless communication terminal includes: a first wireless communication section configured to operate in a first clock system; an asynchronous interface; and a second wireless communication section configured to operate in a second clock system different from the first clock system, and perform short-range wireless communication. The second wireless communication section is connected to the first wireless communication section via the asynchronous interface. The first and second wireless communication sections are formed within a single chip. Content data of a specified content from the content server is supplied to the first wireless communication terminal via the network, or to the first wireless communication section in the second wireless communication terminal via the network and the first wireless communication terminal. Billing information acquired by the second wireless communication section in the second wireless communication terminal is supplied to the billing server via the first wireless communication section, the first wireless communication terminal, and the network.

According to an embodiment, the first wireless communication section, which operates in the first clock system, and the second wireless communication section, which operates in the second clock system and performs short-range wireless communication, are connected to each other via the asynchronous interface. Thus, the first and second wireless communication sections can be formed within a single chip, leading to advantages in terms of costs, power consumption, and space.

Additional features and advantages are described herein, and will be apparent from the following Detailed Description and the figures.

BRIEF DESCRIPTION OF THE FIGURES

FIG. 3 shows an exemplary circuit parameter to be set in a wireless LAN section using an NFC section;

FIG. 11 shows an example of a content set in a system register in the NFC section.

DETAILED DESCRIPTION

Figure 1:
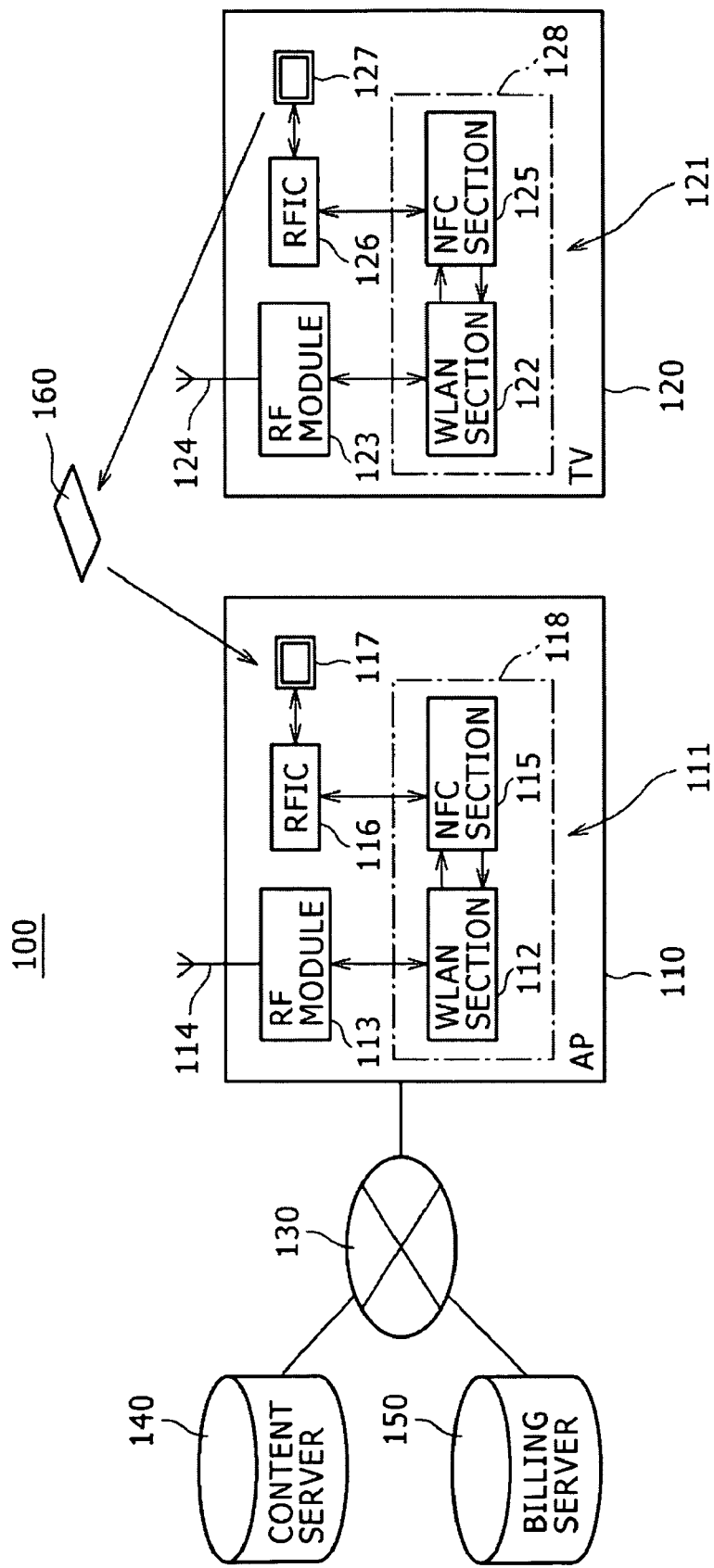
FIG. 1 a block diagram illustrating an exemplary structure of a communication system according to one embodiment.

Hereinafter, an embodiment will be described with reference to the accompanying drawings. FIG. 1 shows an exemplary structure of a communication system 100 according to one embodiment. The communication system 100 includes a wireless local area network (LAN) access point 110 and a television receiver 120. Here, the wireless LAN access point 110 forms a first wireless communication terminal, while the television receiver 120 forms a second wireless communication terminal.

The wireless LAN access point 110 is connected to a network 130. A content server 140 and a billing server 150 are connected to the network 130. The content server 140 has stored therein multiple image contents, and provides content data of an image content desired by a user based on a request from the user. The billing server 150 performs a billing process for the user when the content server 140 provides the content data to the user as described above.

The wireless LAN access point 110 includes a wireless communication section 111. The wireless communication section 111 includes a wireless LAN section (i.e., a WLAN section) 112, an RF module 113, an antenna 114, a near field communication (NFC) section 115, a radio frequency integrated circuit (RFIC) 116, and an NFC antenna 117.

The RF module 113 is connected to the wireless LAN section 112. The antenna 114 is connected to the RF module 113. That is, the wireless LAN section 112, the RF module 113, and the antenna 114 combine to form a substantial wireless LAN section. Further, the RFIC 116 is connected to the NFC section 115. The NFC antenna 117 is connected to the RFIC 116. That is, the NFC section 115, the RFIC 116, and the NFC antenna 117 combine to form a substantial NFC section that performs short-range wireless communication.

Since the wireless LAN section 112 and the NFC section 115 operate in different clock systems (i.e., operate on different clocks) as described below, the wireless LAN section 112 and the NFC section 115 are connected to each other via an asynchronous interface and formed within a single chip (i.e., a single semiconductor integrated circuit) 118. In other words, the wireless LAN section 112 and the NFC section 115 are formed by a single semiconductor device.

Similar to the above-described wireless LAN access point 110, the television receiver 120 includes a wireless communication section 121. The wireless communication section 121 includes a wireless LAN section (i.e., a WLAN section) 122, an RF module 123, an antenna 124, an NFC section 125, an RFIC 126, and an NFC antenna 127.

The RF module 123 is connected to the wireless LAN section 122. The antenna 124 is connected to the RF module 123. That is, the wireless LAN section 122, the RF module 123, and the antenna 124 combine to form a substantial wireless LAN section. Further, the RFIC 126 is connected to the NFC section 125. The NFC antenna 127 is connected to the RFIC 126. That is, the NFC section 125, the RFIC 126, and the NFC antenna 127 combine to form a substantial NFC section that performs short-range wireless communication.

Since the wireless LAN section 122 and the NFC section 125 operate in different clock systems (i.e., operate on different clocks) as described below, the wireless LAN section 122 and the NFC section 125 are connected to each other via an asynchronous interface, and formed within a single chip (i.e., a single semiconductor integrated circuit) 128. In other words, the wireless LAN section 122 and the NFC section 125 are formed by a single semiconductor device.

In the communication system 100 as shown in FIG. 1, a setup (i.e., an initial setting) is performed for the wireless LAN section of the wireless LAN access point 110 and the wireless LAN section of the television receiver 120 to perform wireless communication therebetween. At this time, setup information including an encryption key held in the wireless LAN section 122 of the television receiver 120 is supplied to the wireless LAN section 112 of the wireless LAN access point 110. Based on this setup information, the wireless LAN section 112 performs the setup.

The supply of the setup information from the wireless LAN section 122 of the television receiver 120 to the wireless LAN section 112 of the wireless LAN access point 110 is achieved using an NFC card (i.e., a contactless IC card) 160, for example.

First, the NFC card 160 is placed near the NFC antenna 127 of the television receiver 120. As a result, the setup information including the encryption key is supplied from the wireless LAN section 122 to the contactless IC card 160 via the NFC section 125, so that the setup information is written to the NFC card 160.

Next, the NFC card 160, which has the setup information written thereto as described above, is placed near the NFC antenna 117 of the wireless LAN access point 110. As a result, the NFC section 115 reads the setup information from the NFC card 160, and the setup information is supplied from the NFC section 115 to the wireless LAN section 112.

Figure 2:
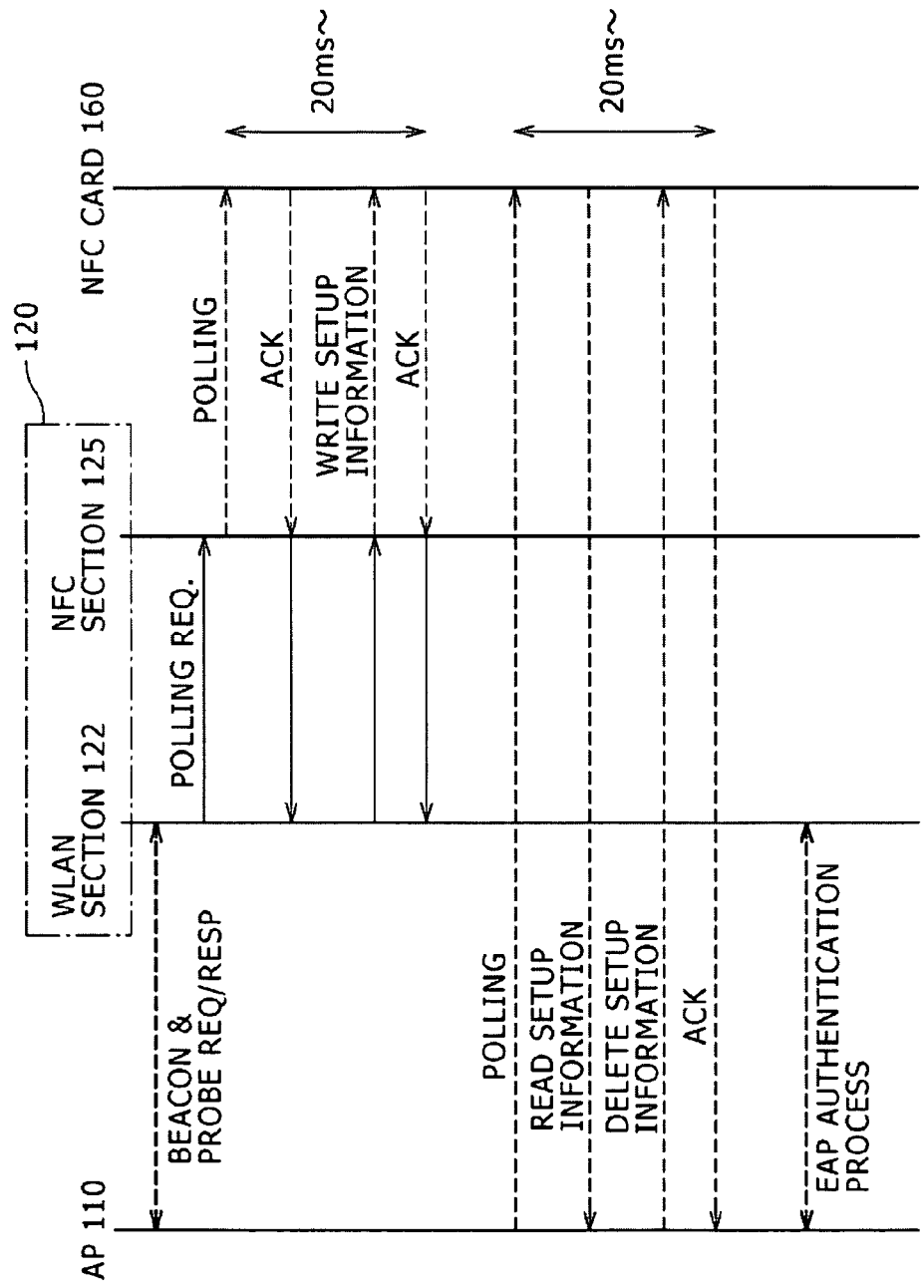
FIG. 2 is a sequence diagram for describing operations of a wireless LAN access point and a television receiver that form part of the communication system when they perform a setup.

FIG. 2 is a sequence diagram illustrating operations of the above sections at the time of setup.

The wireless LAN section 112 of the wireless LAN access point 110 sends a beacon regularly. The wireless LAN section 122 of the television receiver 120 receives the beacon. The beacon includes fixed basic information used for wireless communication. Examples of the basic information include an ID (identification) for identifying the wireless LAN access point 110, and information about a wireless communication system. The wireless LAN section 122 of the television receiver 120 refers to the basic information included in the received beacon to recognize presence of the wireless LAN access point 110, and performs a registering process and so on in connection with the recognized wireless LAN access point 110.

Note that the wireless LAN section 122 of the television receiver 120 may transmit a probe request to the wireless LAN section 112 of the wireless LAN access point 110 to request the basic information included in the beacon. In this case, in response to the probe request, the wireless LAN section 112 of the wireless LAN access point 110 generates a probe response including the basic information, and transmits the generated probe response to the wireless LAN section 122 of the television receiver 120.

After performing the registering process and so on in connection with the wireless LAN access point 110 as described above, the wireless LAN section 122 of the television receiver 120 transmits a polling request to the NFC section 125. In response to the polling request from the wireless LAN section 122, the NFC section 125 performs polling. If the NFC section 125 receives, from the NFC card 160 placed near the NFC antenna 127, a response (ACK: ACKnowledgement) to this polling, the NFC section 125 notifies the wireless LAN section 122 of this fact.

Then, the wireless LAN section 122 transmits the setup information to the NFC card 160 via the NFC section 125, so that the setup information is written to the NFC card 160. After completing the writing of the setup information, the NFC card 160 sends a response (ACK) indicative of the completion of writing to the wireless LAN section 122 via the NFC section 125.

It takes more than 20 ms, for example, to write the setup information to the NFC card 160 by placing the NFC card 160 near the NFC antenna 127.

After the wireless LAN section 122 of the television receiver 120 performs the registering process and so on in connection with the wireless LAN access point 110 as described above, the wireless LAN section 112 of the wireless LAN access point 110 transmits a polling request to the NFC section 115, so that the NFC section 115 performs polling. In response to this polling, the NFC card 160 reads the setup information stored in an internal memory, and sends the setup information to the wireless LAN access point 110.

After receiving the setup information, the wireless LAN access point 110 transmits a request for deleting the setup information to the NFC card 160. In response to this request, the NFC card 160 deletes the setup information, and then sends a response (ACK) indicative of completion of deletion to the wireless LAN access point 110.

Thereafter, the wireless LAN section 112 of the wireless LAN access point 110 and the wireless LAN section 122 of the television receiver 120 perform an authentication process therebetween via an extensible authentication protocol (EAP) using a wireless transmission path.

In the communication system 100 as shown in FIG. 1, circuit parameter setting in the wireless LAN section 112 of the wireless LAN access point 110 is performed by placing the NFC card 160, in which a circuit parameter to be set is stored, near the NFC antenna 117. In this case, in response to polling by the NFC section 115, the NFC card 160 reads the circuit parameter stored in the internal memory and supplies the read circuit parameter to the NFC section 115. The NFC section 115 forwards the circuit parameter to the wireless LAN section 112. As a result, the circuit parameter is set in a predetermined register in the wireless LAN section 112.

FIG. 3 shows an exemplary circuit parameter to be set. FIG. 3 shows an example of a circuit parameter for setting a universal asynchronous receiver/transmitter (UART) speed. The UART is one system of data transmission in a host interface (i.e., a host I/F).

This circuit parameter is composed of 8 bits, i.e., 5-bit data BR_T1 (lower-order 5 bits) and 3-bit data BR_T0 (higher-order 3 bits). "0x1F" represents an address of a register in which this circuit parameter is to be set. "r/w" represents one type, meaning that reading and writing are possible. "SRST" is information concerning resetting, and means that soft reset is enabled. An initial value of the data BR_T0 is 4'hE, while an initial value of the data BR_T1 is 4'hB.

Here, when the UART speed is set at 9600 bps, a circuit parameter of 0xEB is set in the register in which the UART speed is to be set. Meanwhile, when the UART speed is set at 115200 bps, a circuit parameter of 0x7A is set in the register in which the UART speed is to be set.

Note that, in the communication system 100 as shown in FIG. 1, a circuit parameter for the NFC section 115 of the wireless LAN access point 110, a circuit parameter for the wireless LAN section 122 of the television receiver 120, a circuit parameter for the NFC section 125 of the television receiver 120, and so on can also be set easily by reading the respective circuit parameters from the NFC card 160 via the NFC section 115 or 125.

Next, an operation of receiving the image content in the communication system 100 as shown in FIG. 1 will now be described below with reference to a sequence diagram of FIG. 4.

First, the wireless LAN section 122 of the television receiver 120 transmits device authentication information, such as a user ID and a password, entered by a user operation (although a user interface is not shown) to the content server 140 via the wireless LAN access point 110. Based on the device authentication information transmitted, the content server 140 performs an authentication process. After completing authentication, the content server 140 sends a response (ACK) indicative of approval to the wireless LAN section 122 of the television receiver 120 via the wireless LAN access point 110.

Thereafter, based on a user operation, the wireless LAN section 122 of the television receiver 120 requests a menu of the content server 140 via the wireless LAN access point 110. This menu shows the image contents which the content server 140 can provide. In response to the request for the menu, the content server 140 sends the menu to the wireless LAN section 122 of the television receiver 120 via the wireless LAN access point 110.

As a result, the menu is displayed on a display (not shown) of the television receiver 120, so that the user is able to select a desired image content. When the desired image content is selected based on a user operation, the wireless LAN section 122 of the television receiver 120 transmits a polling request to the NFC section 125. In response to the polling request from the wireless LAN section 122, the NFC section 125 performs polling. If the NFC section 125 receives a response (ACK) to this polling, along with card verification information and billing information, from the NFC card 160 for billing use placed near the NFC antenna 127, the NFC section 125 transmits authentication information (i.e., the card verification information and the billing information) to the billing server 150 via the wireless LAN access point 110.

Based on the authentication information transmitted, the billing server 150 performs an authentication process. After completing authentication, the billing server 150 transmits a response (ACK) indicative of approval to the wireless LAN section 122 of the television receiver 120 via the wireless LAN access point 110. This response includes the billing information as well. The wireless LAN section 122 sends the billing information to the NFC card 160 via the NFC section 125. As a result, the NFC card 160 performs a billing process of drawing a charge for the image content selected by the user.

After performing the above billing process, the NFC card 160 sends a response indicative of completion of the billing process to the wireless LAN section 122 via the NFC section 125. The wireless LAN section 122 requests, via the wireless LAN access point 110, the billing server 150 to complete payment. After completing the payment, the billing server 150 sends the authentication information to the content server 140. When authenticating the billing server 150 based on the authentication information, the content server 140 sends a response indicative of approval to the billing server 150.

Upon receipt of this response from the content server 140, the billing server 150 requests the content server 140 to deliver the image content selected by the user in streaming form. In response to the request from the billing server 150, the content server 140 sends data of the image content selected by the user to the wireless LAN section 122 of the television receiver 120 via the wireless LAN access point 110. As a result, an image of the image content selected by the user is displayed at the television receiver 120, and a corresponding audio is outputted therefrom.

Next, regarding the communication system 100 as shown in FIG. 1, the chip 118 in the wireless LAN access point 110 and the chip 128 in the television receiver 120 will now be described below. Since these chips 118 and 128 have similar structures, only the chip 118 will be described herein with reference to FIG. 5, while description of the chip 128 will be omitted.

The chip (i.e., the semiconductor device) 118 includes a CPU 201, a ROM 202, a RAM 203, a host interface (i.e., a host IF) 204, a timer 205, and a general purpose I/O (GPIO) 206, which are connected to an AHB (Advanced High-performance Bus) bus 207 as a CPU bus. The CPU 201 is an internal CPU of the wireless LAN section 112, and controls operations of the wireless LAN section 112 and the NFC section 115. The NFC section 115 is connected to the AHB bus 207. The NFC section 115 is a circuit conforming to Wi-Fi Protected Setup, and is of an active type, having a power supply.

Figure 5:
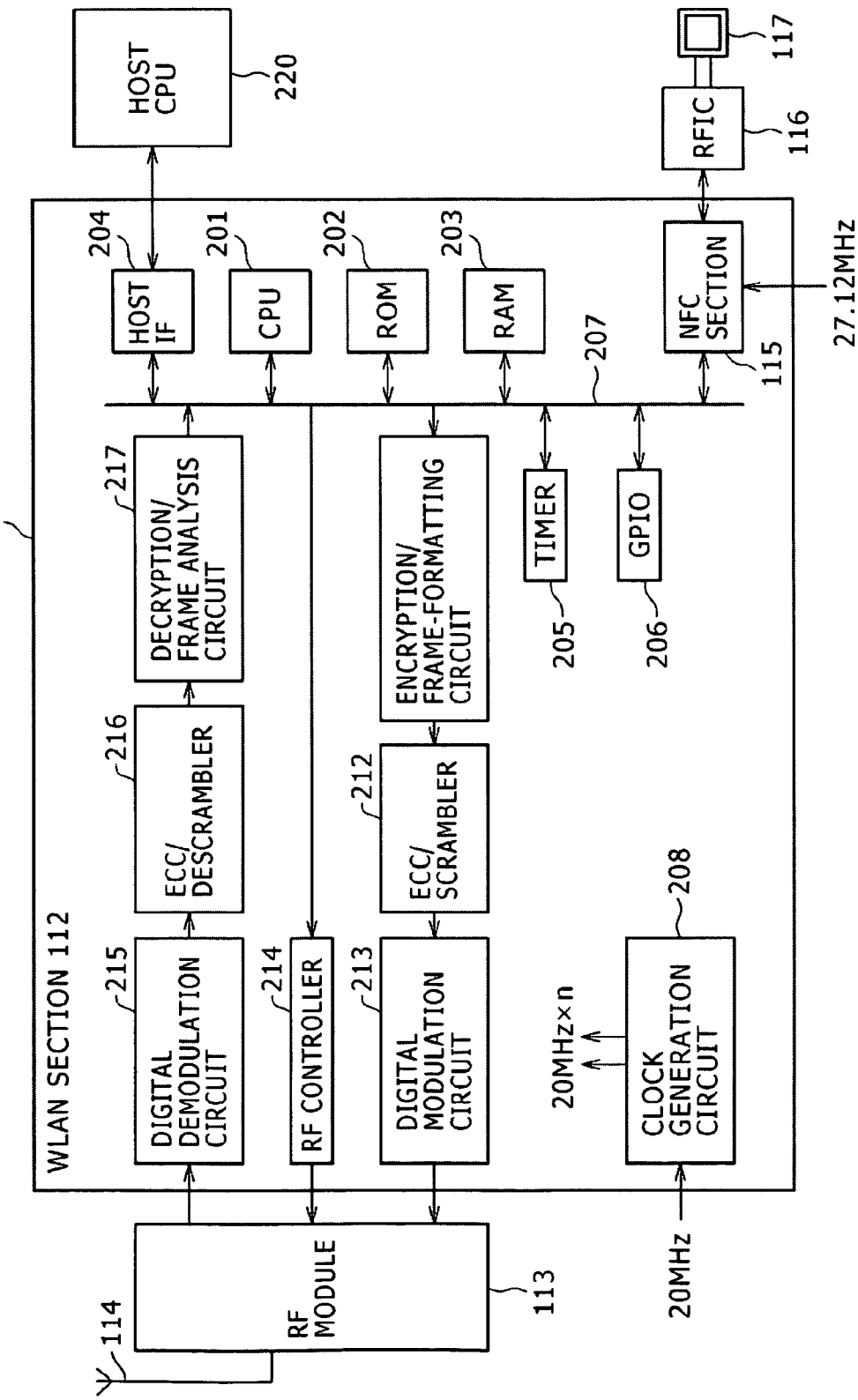
FIG. 5 is a block diagram illustrating exemplary structures of the wireless LAN section and the NFC section formed within a single chip.

The host interface 204 is an interface for connecting to a host CPU (a personal computer) 220 as necessary, as shown in FIG. 5. The circuit parameter for the wireless LAN section 112 or the NFC section 115 may be set using the host CPU 220 connected to the host interface 204.

In addition, the chip 118 includes a clock generation circuit 208. A 20 MHz signal is supplied from an outside to the clock generation circuit 208. Based on the 20 MHz signal, the clock generation circuit 208 generates a clock of n times 20 MHz (n=1, 2, . . . ), and supplies the clock to each part of the wireless LAN section 112. Meanwhile, a 27.12 MHz signal is supplied from the outside to the NFC section 115. The NFC section 115 generates and uses a clock based on this 27.12 MHz signal as described below. As described above, the wireless LAN section 112 and the NFC section 115 operate in different clock systems.

In addition, the chip 118 includes an encryption/frame-formatting circuit 211, an ECC/scrambler 212, a digital modulation circuit 213, an RF controller 214, a digital demodulation circuit 215, an ECC/descrambler 216, and a decryption/frame analysis circuit 217. The encryption/frame-formatting circuit 211, the RF controller 214, and the decryption/frame analysis circuit 217 are connected to the AHB bus 207.

The encryption/frame-formatting circuit 211 encrypts transmission data (i.e., data to be transmitted), and further converts it into a frame format. The ECC/scrambler 212 subjects the data outputted from the encryption/frame-formatting circuit 211 to error correction coding and scrambling. The digital modulation circuit 213 subjects the data outputted from the ECC/scrambler 212 to digital modulation.

The RF module 113 upconverts the data outputted from the digital modulation circuit 213, i.e., a digitally modulated signal, to obtain a radio-frequency signal, and supplies it to the antenna 114. Meanwhile, the RF module 113 downconverts a radio-frequency signal received by the antenna 114 to generate a digitally modulated baseband signal, and supplies it to the digital demodulation circuit 215. The RF controller 214 controls an operation of the RF module 113.

The digital demodulation circuit 215 subjects the digitally modulated baseband signal supplied from the RF module 113 to digital demodulation. The ECC/descrambler 216 subjects the data outputted from the digital demodulation circuit 215 to descrambling and error correction. The decryption/frame analysis circuit 217 subjects the data outputted from the ECC/descrambler 216 to frame analysis to obtain pre-frame-formatted data, and decrypts it to obtain reception data.

Transmitting and receiving operations of the wireless LAN section 112 in the chip 118 as shown in FIG. 5 will now be described below.

The transmitting operation will be described first.

The transmission data is supplied to the encryption/frame-formatting circuit 211. Examples of the transmission data include: data inputted via the GPIO 206 and temporarily stored in the RAM 203; various types of information stored in the ROM 202; and data generated by the CPU 201.

The encryption/frame-formatting circuit 211 encrypts the transmission data, and further converts it into the frame format. The data outputted from the encryption/frame-formatting circuit 211 is supplied to the ECC/scrambler 212. The ECC/scrambler 212 subjects the data outputted from the encryption/frame-formatting circuit 211 to error correction coding and to scrambling to increase an error correcting ability against burst noise.

The data outputted from the ECC/scrambler 212 is supplied to the digital modulation circuit 213. The digital modulation circuit 213 subjects the data outputted from the ECC/scrambler 212 to digital modulation. The data outputted from the digital modulation circuit 213, i.e., the digitally modulated signal, is upconverted by the RF module 113 into the radio-frequency signal, which is then transmitted via the antenna 114.

Next, the receiving operation will be described below.

The radio-frequency signal received by the antenna 114 is supplied to the RF module 113. The RF module 113 downconverts the radio-frequency signal to obtain the digitally modulated baseband signal. The digitally modulated baseband signal is supplied to the digital demodulation circuit 215. The digital demodulation circuit 215 subjects the digitally modulated baseband signal supplied from the RF module 113 to digital demodulation.

The data outputted from the digital demodulation circuit 215 is supplied to the ECC/descrambler 216. The ECC/descrambler 216 subjects the data outputted from the digital demodulation circuit 215 to descrambling and error correction. The data outputted from the ECC/descrambler 216 is supplied to the decryption/frame analysis circuit 217. The decryption/frame analysis circuit 217 subjects the data outputted from the ECC/descrambler 216 to frame analysis to obtain the pre-frame-formatted data, and decrypts it to obtain the reception data.

The reception data obtained by the decryption/frame analysis circuit 217 is stored in the RAM 203 temporarily, and then either outputted to the outside of the wireless LAN section 112 via the GPIO 206 or supplied to the CPU 201, for example.

Figure 6:
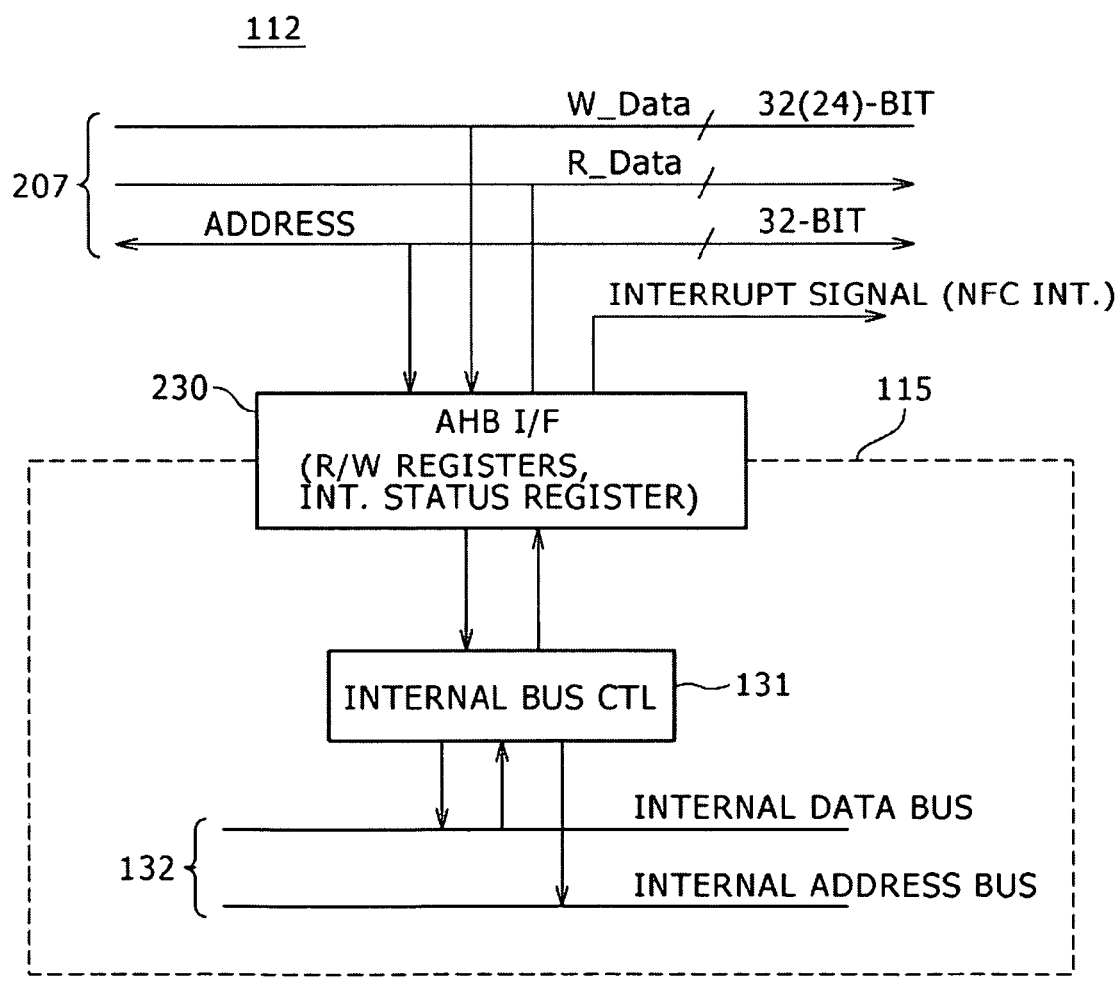
FIG. 6 is a block diagram illustrating a structure of a part at which the NFC section and the wireless LAN section are connected to each other.

Next, a part at which the NFC section 115 and the wireless LAN section 112 are connected to each other will now be described below with reference to FIG. 6.

An AHB interface (i.e., an AHB I/F) 230, which is an asynchronous interface, mediates between the AHB bus 207 in the wireless LAN section 112 and the NFC section 115. As described above, the wireless LAN section 112 and the NFC section 115 operate in different clock systems. The AHB interface 230 reconciles the difference in clock system between the wireless LAN section 112 and the NFC section 115.

The AHB interface 230 includes a write register (i.e., a W register), a read register (i.e., an R register), and an interrupt status register (i.e., an int. status register) as described below. The AHB interface 230 is connected to a write data bus, a read data bus, and an address bus, which combine to form the AHB bus 207. Each of the data buses is a 32-bit or 24-bit bus, for example. The address bus is a 32-bit bus, for example. The AHB interface 230 is connected to an internal bus 132 (which is composed of an internal data bus and an internal address bus) via an internal bus controller (i.e., an internal bus CTL) 131 of the NFC section 115.

Interrupt signals (NFC Int.) are outputted from the AHB interface 230 asynchronously. The interrupt signals are supplied to the CPU 201 (see FIG. 5) in the wireless LAN section 112. Details of the interrupt signals will be described later.

Next, referring to FIG. 7, exemplary structures of the NFC section 115, which is connected to the AHB bus 207 in the wireless LAN section 112, and the RFIC 116, which is externally attached to the chip 118, will now be described below.

The NFC section 115 includes the internal bus controller 131, the internal bus 132, a "system controller & FIFO buffer" 133, a digital modulation circuit 134, a drive data generation circuit 135, a digital demodulation circuit 136, a clock generation circuit (i.e., a CLK generation circuit) 137, and a system register 138.

The system controller & FIFO buffer 133 controls an overall operation of the NFC section 115. The system register 138 includes a plurality of registers for internal control. Values set in these registers within the system register 138 determine a transmission speed, a communication type, and so on. The CPU 201 in the wireless LAN section 112 is capable of accessing an internal memory of the system controller & FIFO buffer 133 and each of the registers within the system register 138 via the AHB interface 230 and the internal bus controller 131.

The clock generation circuit 137 generates a 13.56 MHz clock based on the 27.12 MHz signal supplied from the outside. Each part of the NFC section 115 operates on this 13.56 MHz clock. The digital modulation circuit 134 subjects transmission data supplied from the system controller & FIFO buffer 133 to digital modulation. Based on the data outputted from the digital modulation circuit 134, the drive data generation circuit 135 generates drive data to be supplied to the RFIC 116.

The digital demodulation circuit 136 subjects a digitally modulated signal supplied from the RFIC 116 to digital demodulation to obtain reception data, and supplies the reception data to the system controller & FIFO buffer 133.

The RFIC 116 includes a "current driver & matching circuit" 141, a detector circuit 142, an RF detection section 143, a band-pass filter (BPF) 144, a comparator (Comp) 145, and a carrier extractor 146.

Based on the data outputted from the drive data generation circuit 135 in the NFC section 115, the current driver & matching circuit 141 generates an ASK (Amplitude Shift Keying) modulated signal to drive the NFC antenna 117. The detector circuit 142 receives an ASK modulated signal received by the NFC antenna 117 via an attenuator 119 to detect it. The comparator 145 receives a signal outputted from the detector circuit 142 via the band-pass filter 144. The comparator 145 compares the signal outputted from the detector circuit 142 with a threshold to obtain two-level data, and supplies the two-level data to the digital demodulation circuit 136 in the NFC section 115.

Based on the signal outputted from the detector circuit 142, the RF detection section 143 detects whether the NFC antenna 117 has received any signal, and supplies a detected output to the digital demodulation circuit 136 in the NFC section 115. Based on the detected output from the RF detection section 143, the digital demodulation circuit 136 performs demodulation only when the NFC antenna 117 has received a signal. The carrier extractor 146 extracts a carrier (i.e., a carrier signal) of the signal received, and supplies the carrier to the digital demodulation circuit 136 in the NFC section 115. Based on the carrier extracted by the carrier extractor 146, the digital demodulation circuit 136 acquires a digitally modulated signal from the two-level data.

Figure 7:
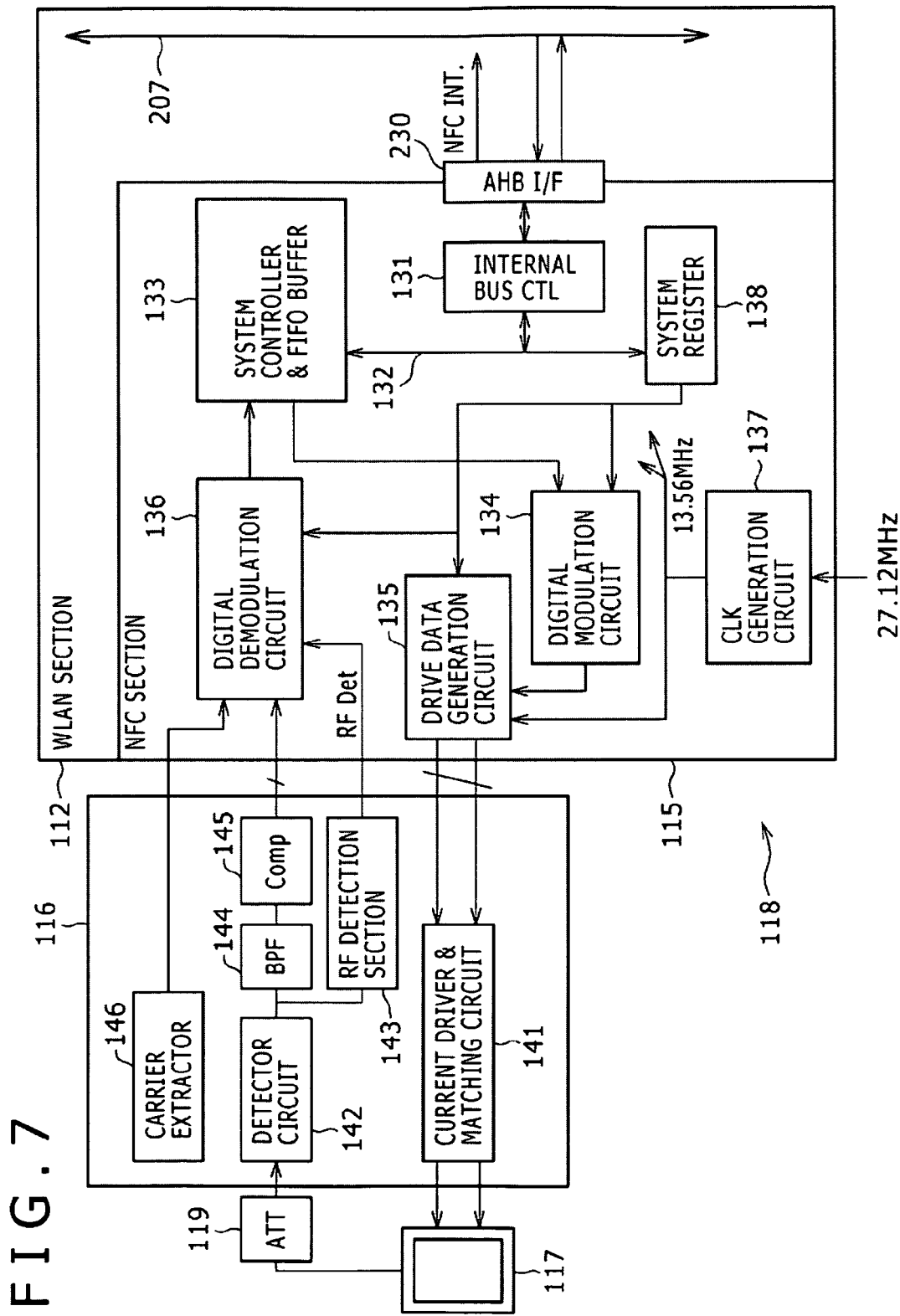
FIG. 7 is a block diagram illustrating exemplary structures of an RFIC and the NFC section connected to a CPU bus (i.e., an AHB bus) in the wireless LAN section.

Transmitting and receiving operations of the NFC section 115 and the RFIC 116 as shown in FIG. 7 will now be described below.

The transmitting operation will be described first.

The transmission data is supplied from the system controller & FIFO buffer 133 to the digital modulation circuit 134. Examples of the transmission data include: data supplied from the wireless LAN section 112 to the system controller & FIFO buffer 133 via the AHB interface 230 and the internal bus controller 131; and data generated within the system controller & FIFO buffer 133.

The digital modulation circuit 134 subjects the transmission data to digital modulation. The data outputted from the digital modulation circuit 134, i.e., a digitally modulated signal, is supplied to the drive data generation circuit 135. Based on the digitally modulated signal, the drive data generation circuit 135 generates the drive data for driving the RFIC 116. The drive data generated is supplied to the current driver & matching circuit 141 in the RFIC 116. The current driver & matching circuit 141 generates the ASK modulated signal based on the drive data to drive the NFC antenna 117 for transmission.

Next, the receiving operation will now be described below.

The ASK modulated signal received by the NFC antenna 117 is supplied to the detector circuit 142 in the RFIC 116 via the attenuator 119. The detector circuit 142 performs a detection process on the ASK modulated signal. The signal outputted from the detector circuit 142 is supplied to the comparator 145 via the band-pass filter 144. The band-pass filter 144 is provided to remove unwanted signal components (i.e., noise). The comparator 145 compares the signal outputted from the detector circuit 142 with the threshold to obtain the two-level data. This two-level data is supplied to the digital demodulation circuit 136 in the NFC section 115.

Meanwhile, the carrier extractor 146 extracts the carrier from the signal received. The carrier extracted is supplied to the digital demodulation circuit 136 in the NFC section 115. Based on the carrier supplied from the carrier extractor 146, the digital demodulation circuit 136 acquires the digitally modulated signal from the two-level data supplied from the comparator 145. In addition, the digital demodulation circuit 136 subjects the digitally modulated signal to digital demodulation to obtain the reception data. The reception data obtained by the digital demodulation circuit 136 is supplied to the system controller & FIFO buffer 133.

Next, operations of the CPU 201 in the wireless LAN section 112 when writing data to a storage section (i.e., a register or memory) at a specified address in the NFC section 115 and when reading data from the specified storage section will now be described below.

Figure 8:
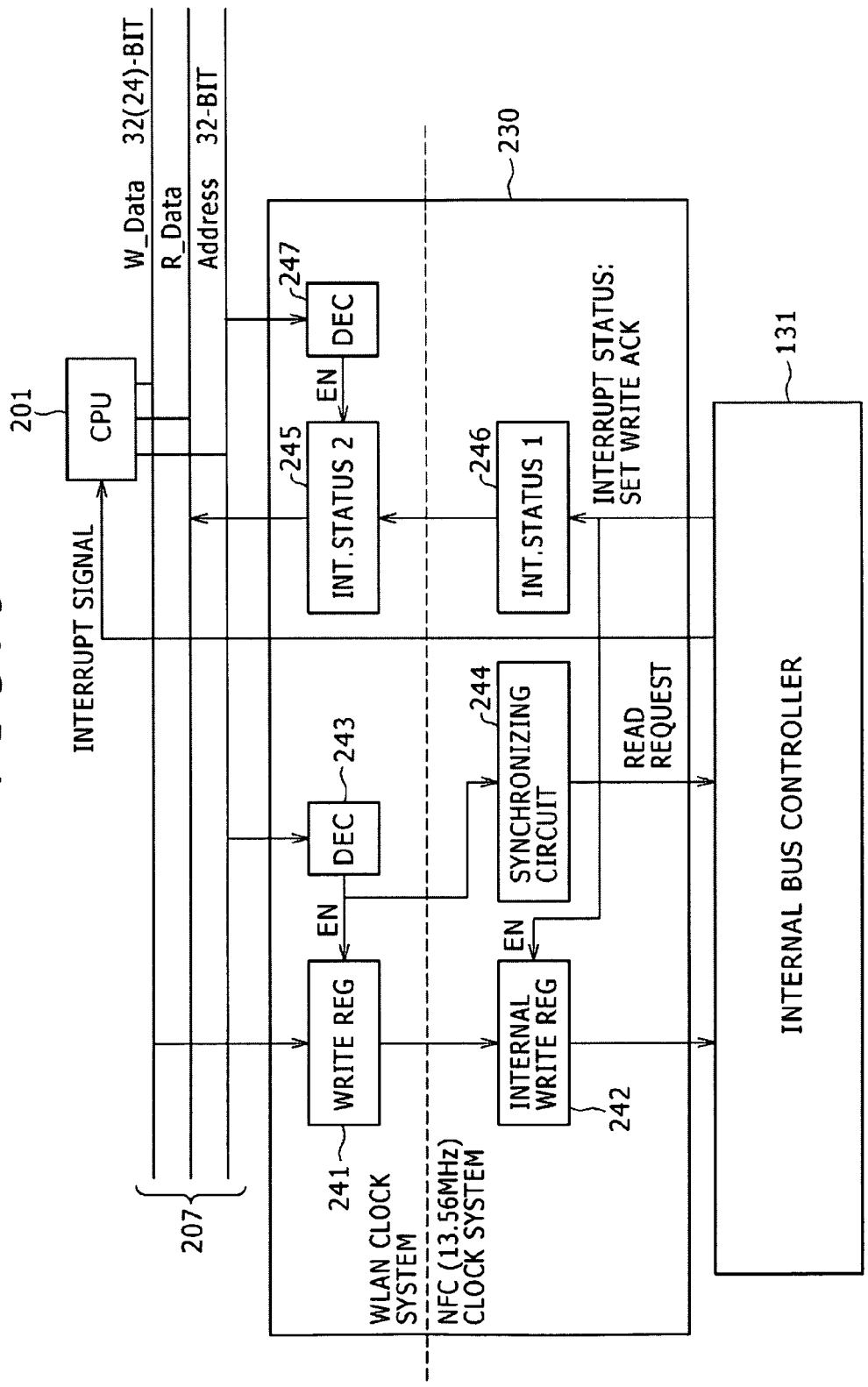
FIG. 8 illustrates an internal structure of an AHB interface used when a CPU in the wireless LAN section writes data to the NFC section, and this writing operation.

As shown in FIG. 8, the AHB interface 230 includes a write register (Write reg) 241, an internal write register (Internal Write reg) 242, an address decoder 243, and a synchronizing circuit 244. The write register 241 operates in the clock system of the wireless LAN section 112, and an input side and an output side of the write register 241 are connected to the write data bus of the AHB bus 207 and an input side of the internal write register 242, respectively. An input side of the address decoder 243 is connected to the address bus of the AHB bus 207. The address decoder 243 decodes an address for the write register 241, and supplies an enable signal EN to the write register 241.

The internal write register 242 operates in the clock system of the NFC section 115. An output side of the internal write register 242 is connected to the internal bus controller 131. In response to the enable signal EN supplied from the address decoder 243 to the write register 241, the synchronizing circuit 244 supplies a read request (Read Request) to the internal bus controller 131.

Figure 9:
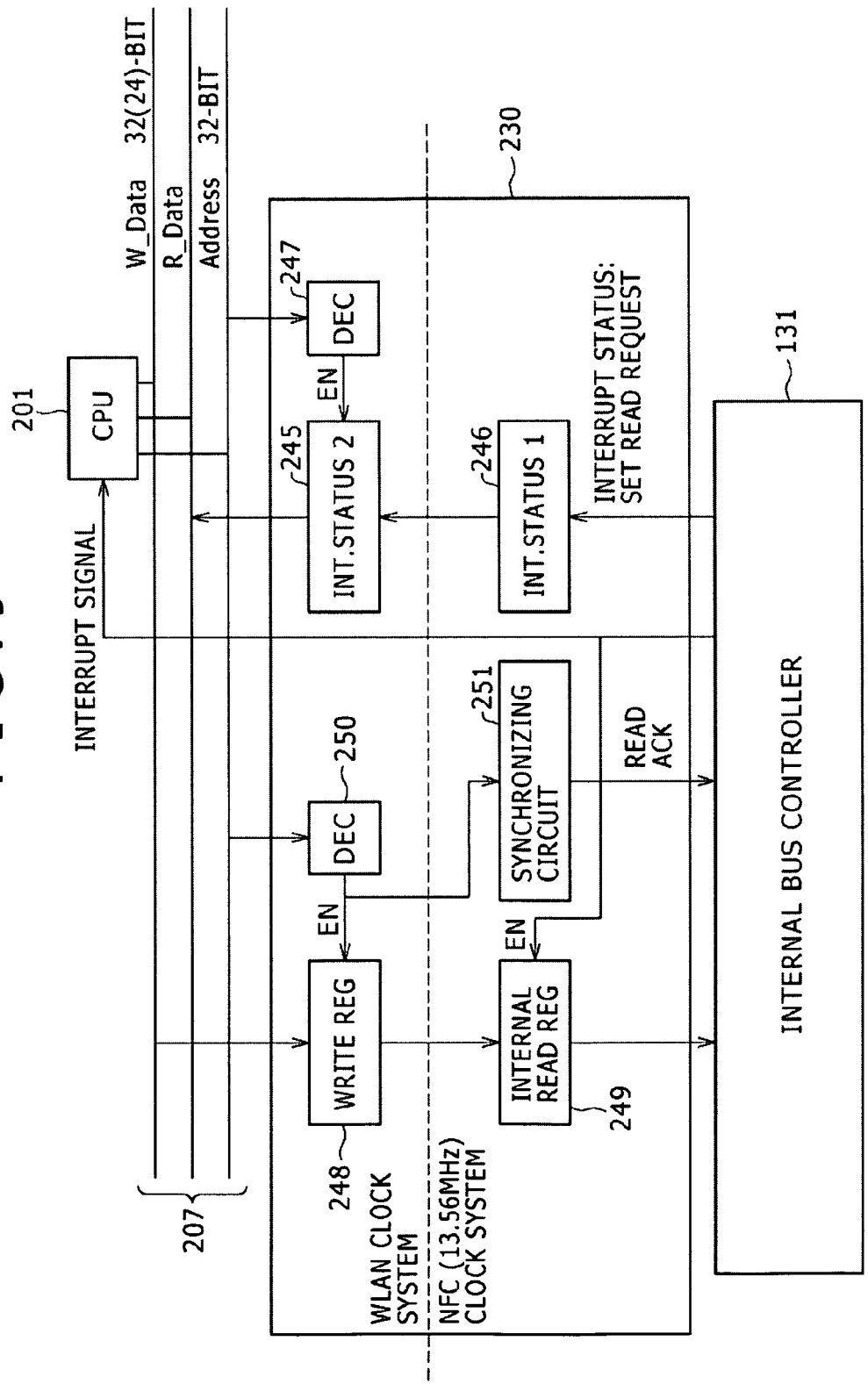
FIG. 9 illustrates an internal structure of the AHB interface used when the CPU in the wireless LAN section reads data from the NFC section, and this reading operation.

As shown in FIG. 9, the AHB interface 230 also includes a read register (Read reg) 248, an internal read register (Internal Read reg) 249, an address decoder 250, and a synchronizing circuit 251. The read register 248 operates in the clock system of the wireless LAN section 112, and an output side and an input side of the read register 248 are connected to the read data bus of the AHB bus 207 and an output side of the internal read register 249, respectively. An input side of the address decoder 250 is connected to the address bus of the AHB bus 207. The address decoder 250 decodes an address for the read register 248, and supplies an enable signal EN to the read register 248.

The internal read register 249 operates in the clock system of the NFC section 115. An input side of the internal read register 249 is connected to the internal bus controller 131. In response to the enable signal EN supplied from the address decoder 250 to the read register 248, the synchronizing circuit 251 supplies a read ACK (Acknowledgement) indicative of completion of reading to the internal bus controller 131.

In addition, as shown in FIGS. 8 and 9, the AHB interface 230 includes an interrupt status register (Int. Status2) 245, an interrupt status register (Int. Status1) 246, and an address decoder 247. The interrupt status register 245 operates in the clock system of the wireless LAN section 112, and an output side and an input side of the interrupt status register 245 are connected to the read data bus of the AHB bus 207 and an output side of the interrupt status register 246, respectively. An input side of the address decoder 247 is connected to the address bus of the AHB bus 207. The address decoder 247 decodes an address for the interrupt status register 245, and supplies an enable signal EN to the interrupt status register 245.

The interrupt status register 246 operates in the clock system of the NFC section 115. An input side of the interrupt status register 246 is connected to the internal bus controller 131. When the read request is supplied from the synchronizing circuit 244, the internal bus controller 131 sets a write ACK, indicative of completion of writing, in the interrupt status register 246, and supplies an enable signal EN to the internal write register 242. In addition, when data at an address specified by the CPU 201 in the wireless LAN section 112 has been prepared, the internal bus controller 131 sets a read request in the interrupt status register 246.

When the data at the address specified by the CPU 201 in the wireless LAN section 112 has been prepared, the internal bus controller 131 supplies an enable signal EN to the internal read register 249, and supplies an interrupt signal to the CPU 201 in the wireless LAN section 112. Further, when the data from the CPU 201 in the wireless LAN section 112 written to the internal write register 242 has been written to the specified storage section (i.e., the register or memory) in the NFC section 115, the internal bus controller 131 supplies an interrupt signal to the CPU 201 in the wireless LAN section 112.

Referring to FIG. 8, the operation of the CPU 201 in the wireless LAN section 112 when writing the data to the storage section (i.e., the register or memory) at the specified address in the NFC section 115 will now be described below.

First, the CPU 201 in the wireless LAN section 112 places an address of the write register 241 on the address bus of the AHB bus 207, and places write data on the write data bus. When the address of the write register 241 has been placed on the address bus, this address is decoded by the address decoder 243, and the enable signal EN is supplied to the write register 241. As a result, the write data placed on the write data bus is written to the write register 241.

Figure 10:
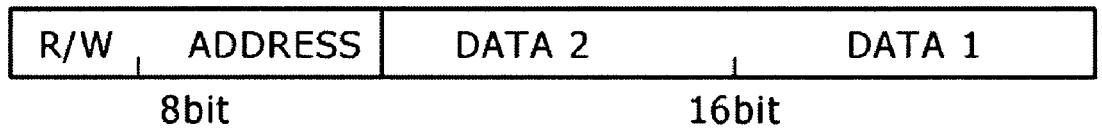
FIG. 10 illustrates a structure of write/read data (i.e., RW data)

Here, the structure of the write data placed on the write data bus will now be described below. FIG. 10 shows write data composed of 24 bits. Higher-order 8 bits form an address section, while the remaining 16 bits form a data section. An MSB "R/W" of the address section is a bit for identifying whether this write data specifies an address in the NFC section 115 from which data is to be read. In the case where the write data specifies the address in the NFC section 115 from which the data is to be read, for example, "R/W" is set to "1".

Accordingly, the address in the NFC section 115 is arranged in the remaining 7 bits of the address section. Two pieces of 8-bit data Data1 and Data2 are arranged in the 16-bit data section. Note that only the 8-bit data Data1 may be arranged in the data section. Incidentally, although not shown, in the case where the write data is composed of 32 bits, the data section is composed of 24 bits, and three pieces of 8-bit data Data1, Data2, and Data3 can be arranged in the data section. Although a detailed description will be omitted, read data also has a similar structure to that of the write data described above.

In response to the enable signal EN supplied from the address decoder 243 to the write register 241, the synchronizing circuit 244 supplies the read request (Read Request) to the internal bus controller 131. When the read request is supplied from the synchronizing circuit 244, the internal bus controller 131 supplies the enable signal EN to the internal write register 242. As a result, the write data written to the write register 241 is written to the internal write register 242. In addition, when the read request is supplied from the synchronizing circuit 244, the internal bus controller 131 sets the write ACK, indicative of the completion of writing, in the interrupt status register 246.

Next, the internal bus controller 131 reads the write data written to the internal write register 242, and checks the status of the MSB "R/W" of the address section. In this case, the status of "R/W" is "0", and the internal bus controller 131 judges that the write data does not specify the address in the NFC section 115 from which the data is to be read. Accordingly, the internal bus controller 131 places the address arranged in the address section of the write data on the internal address bus, and places the data arranged in the data section of the write data on the internal data bus. As a result, the data is written to the storage section (i.e., the register or memory) at the specified address in the NFC section 115.

Thereafter, the internal bus controller 131 supplies the interrupt signal to the CPU 201 in the wireless LAN section 112. When this interrupt signal has been supplied, the CPU 201 places an address of the interrupt status register 245 on the address bus. When the address of the interrupt status register 245 has been placed on the address bus, the address decoder 247 decodes this address, and supplies the enable signal EN to the interrupt status register 245. As a result, an interrupt status "write ACK" set in the interrupt status register 246 is written to the interrupt status register 245. Accordingly, this interrupt status "write ACK" is supplied to the CPU 201 via the read data bus, so that the CPU 201 recognizes that the data has been written to the specified address in the NFC section 115.

By the writing operation as described above, the CPU 201 in the wireless LAN section 112 is able to configure each register within the system register 138 of the NFC section 115 based on an instruction from the host CPU (i.e., the personal computer) 220 connected to the host interface 204, for example.

FIG. 11 shows an example of a content set in the register, showing a content set in a transmission mode setting register.

In this case, the content set is composed of 8 bits, including data TxFraming composed of two bits (bits 0 and 1), data TxSpeed composed of three bits (bits 4 to 6), and data TxCR-CEn composed of one bit (bit 7). The data TxFraming represents a transmission mode, and an initial value thereof is 2'b00. Here, "00" represents "MIFARE", "01" represents "Active Communication Mode", "10" represents "FeliCa", and "11" represents "TypeB".

The data TxSpeed represents a transmission speed, and an initial value thereof is 3'b001. Here, "000" represents 106 kbps, "001" represents 212 kbps, "010" represents 424 kbps, and "011" represents 848 kbps. The data TxCRCEn represents "CRC generation enable" at the time of data transmission, and an initial value thereof is 1'b1. Note that "dy" indicates a register that can be automatically changed internally, and that "SRST" is information concerning resetting and means that soft reset is enabled. When transmission is performed with 212 kbps/FeliCa, for example, the 8 bits in the transmission mode setting register is set to "10010010" (92h).

Referring to FIGS. 8 and 9, the operation of the CPU 201 in the wireless LAN section 112 when reading the data from the storage section (i.e., the register or memory) at the specified address in the NFC section 115 will now be described below.

First, the CPU 201 in the wireless LAN section 112 places the address of the write register 241 on the address bus of the AHB bus 207, and places write data on the write data bus. This write data has the structure as shown in FIG. 10 described above. In this case, the MSB "R/W" of the address section is set to "1", indicating that this write data specifies the address in the NFC section 115 from which the data is to be read. The address in the NFC section 115 from which the data is to be read is arranged in the remaining 7 bits of the address section.

When the address of the write register 241 has been placed on the address bus, the address decoder 243 decodes this address, and supplies the enable signal EN to the write register 241. As a result, the write data placed on the write data bus is written to the write register 241.

In addition, in response to the enable signal EN supplied from the address decoder 243 to the write register 241, the synchronizing circuit 244 supplies the read request (Read Request) to the internal bus controller 131. When the read request is supplied from the synchronizing circuit 244, the internal bus controller 131 supplies the enable signal EN to the internal write register 242. As a result, the write data written to the write register 241 is written to the internal write register 242.

Next, the internal bus controller 131 reads the write data written to the internal write register 242, and checks the status of the MSB "R/W" of the address section. In this case, the status of "R/W" is "1", and the internal bus controller 131 judges that the write data specifies the address in the NFC section 115 from which the data is to be read. Accordingly, the internal bus controller 131 prepares the data (hereinafter referred to as "read data" as appropriate) at the specified address in the NFC section 115.

Then, when the read data in the NFC section 115 has been prepared, the internal bus controller 131 sets an interrupt status "read request" in the interrupt status register 246 as shown in FIG. 9. In addition, when the read data has been prepared, the internal bus controller 131 supplies the enable signal EN to the internal read register 249, and supplies the interrupt signal to the CPU 201 in the wireless LAN section 112. As a result, the read data prepared by the internal bus controller 131 is written to the internal read register 249.

Meanwhile, the CPU 201 in the wireless LAN section 112, which has been supplied with the interrupt signal, places the address of the interrupt status register 245 on the address bus. When the address of the interrupt status register 245 has been placed on the address bus, the address decoder 247 decodes this address, and supplies the enable signal EN to the interrupt status register 245. As a result, the interrupt status "read request" set in the interrupt status register 246 is written to the interrupt status register 245. As a result, the interrupt status "read request" is supplied to the CPU 201 via the read data bus.

In response to the read request, the CPU 201 places an address of the read register 248 on the address bus. When the address of the read register 248 has been placed on the address bus, the address decoder 250 decodes this address, and supplies the enable signal EN to the read register 248. As a result, the read data written to the internal read register 249 is written to the read register 248. Thus, the CPU 201 is able to acquire the read data (i.e., the data at the specified address in the NFC section 115) via the read data bus.

In response to the enable signal EN supplied from the address decoder 250 to the read register 248 as described above, the synchronizing circuit 251 supplies the read ACK (Acknowledgement), indicative of the completion of reading, to the internal bus controller 131. As a result, the internal bus controller 131 is able to recognize that the CPU 201 has completed the reading of the read data.

Note that, in the AHB interface 230 as shown in FIGS. 8 and 9, a portion of the write register 241 and the internal write register 242, a portion of the read register 248 and the internal read register 249, and a portion of the interrupt status register 245 and the interrupt status register 246 may be each formed with a single random access memory (RAM).

In the communication system 100 as shown in FIG. 1, the asynchronous interface (i.e., the AHB interface 230) mediates between the wireless LAN section 112 and the NFC section 115 in the wireless communication section 111 of the wireless LAN access point 110, and the wireless LAN section 112 and the NFC section 115 are formed within the single chip 118. Thus, the wireless communication section 111 of the wireless LAN access point 110 is advantageous in terms of costs, power consumption and space compared to the case where the wireless LAN section 112 and the NFC section 115 are formed with separate chips.

As described above, the NFC section 115 is connected to the AHB bus (i.e., the CPU bus) 207 in the wireless LAN section 112 via the AHB interface 230. Therefore, the CPU 201 in the wireless LAN section 112 is able to control the NFC section 115 in a centralized manner. For example, when the operation of the NFC section 115 is not necessary, the CPU 201 in the wireless LAN section 112 is capable of turning off power of the NFC section 115 or suspending supply of the clock to reduce the power consumption.

In addition, in the communication system 100 as shown in FIG. 1, the asynchronous interface (i.e., the AHB interface 230) mediates between the wireless LAN section 122 and the NFC section 125 in the wireless communication section 121 of the television receiver 120, and the wireless LAN section 122 and the NFC section 125 are formed within the single chip 128. Thus, the wireless communication section 121 achieves similar effects to those achieved by the wireless communication section 111 of the wireless LAN access point 110 as described above.

Further, in the wireless communication section 111 of the wireless LAN access point 110 in the communication system 100 as shown in FIG. 1, the NFC section 115 is connected to the wireless LAN section 112 via the asynchronous interface.

Therefore, the wireless LAN section 112 is capable of outputting predetermined data to the outside via the NFC section 115, or acquiring the predetermined data from the outside via the NFC section 115.

Similarly, in the wireless communication section 121 of the television receiver 120 in the communication system 100 as shown in FIG. 1, the NFC section 125 is connected to the wireless LAN section 122 via the asynchronous interface. Therefore, the wireless LAN section 122 is capable of outputting predetermined data to the outside via the NFC section 125, or acquiring the predetermined data from the outside via the NFC section 125.

Therefore, in the communication system 100 as shown in FIG. 1, it is possible to supply the circuit parameters to the wireless LAN sections 112 and 122 via the NFC sections 115 and 125 to set the circuit parameters easily in the wireless LAN sections 112 and 122.

Further, the wireless LAN section 122 in the television receiver 120 is capable of writing the setup information to the NFC card 160 via the NFC section 125. Still further, the wireless LAN section 112 in the wireless LAN access point 110 is capable of taking the setup information from the NFC card 160 via the NFC section 115 to perform the setup (i.e., the initial setting). Therefore, in the communication system 100 as shown in FIG. 1, it is possible to perform a setup for a wireless LAN easily and in a short time.

Still further, in the television receiver 120 in the communication system 100 as shown in FIG. 1, the billing information can be supplied from the NFC card 160 to the wireless LAN section 122 via the NFC section 125. In other words, the wireless LAN section 122 is capable of acquiring the billing information, which is to be sent to the billing server 150, via the NFC section 125. Therefore, in the communication system 100 as shown in FIG. 1, it is possible to perform the billing process easily, which accompanies reception of the content, using the NFC card 160.

Still further, in the wireless communication section 111 of the wireless LAN access point 110 in the communication system 100 as shown in FIG. 1, the NFC section 115 is connected to the AHB bus (i.e., the CPU bus) 207 in the wireless LAN section 112 via the AHB interface 230. Therefore, the CPU 201 in the wireless LAN section 112 is capable of accessing the storage section (i.e., the register or memory) in the NFC section 115 easily. Accordingly, the CPU 201 in the wireless LAN section 112 is capable of configuring each register within the system register 138 in the NFC section 115, for example.

In this case, the CPU 201 supplies the address of the storage section to be accessed in the NFC section 115 over the data bus in the AHB bus (i.e., the CPU bus) 207. Therefore, storage sections within the NFC section 115 are not developed in parallel on an address space of the CPU 201. Instead, the NFC section 115 occupies only one address, leading to easy porting.

Still further, in the wireless communication section 121 of the television receiver 120 in the communication system 100 as shown in FIG. 1, as with the wireless communication section 111 of the wireless LAN access point 110, the NFC section 125 is connected to the AHB bus (i.e., the CPU bus) 207 in the wireless LAN section 122 via the AHB interface 230. Therefore, the wireless communication section 121 also achieves similar effects to those achieved by the wireless communication section 111 of the wireless LAN access point 110 as described above, concerning access to the storage section (i.e., the register or memory) in the NFC section 125 and so on.

Figure 12:
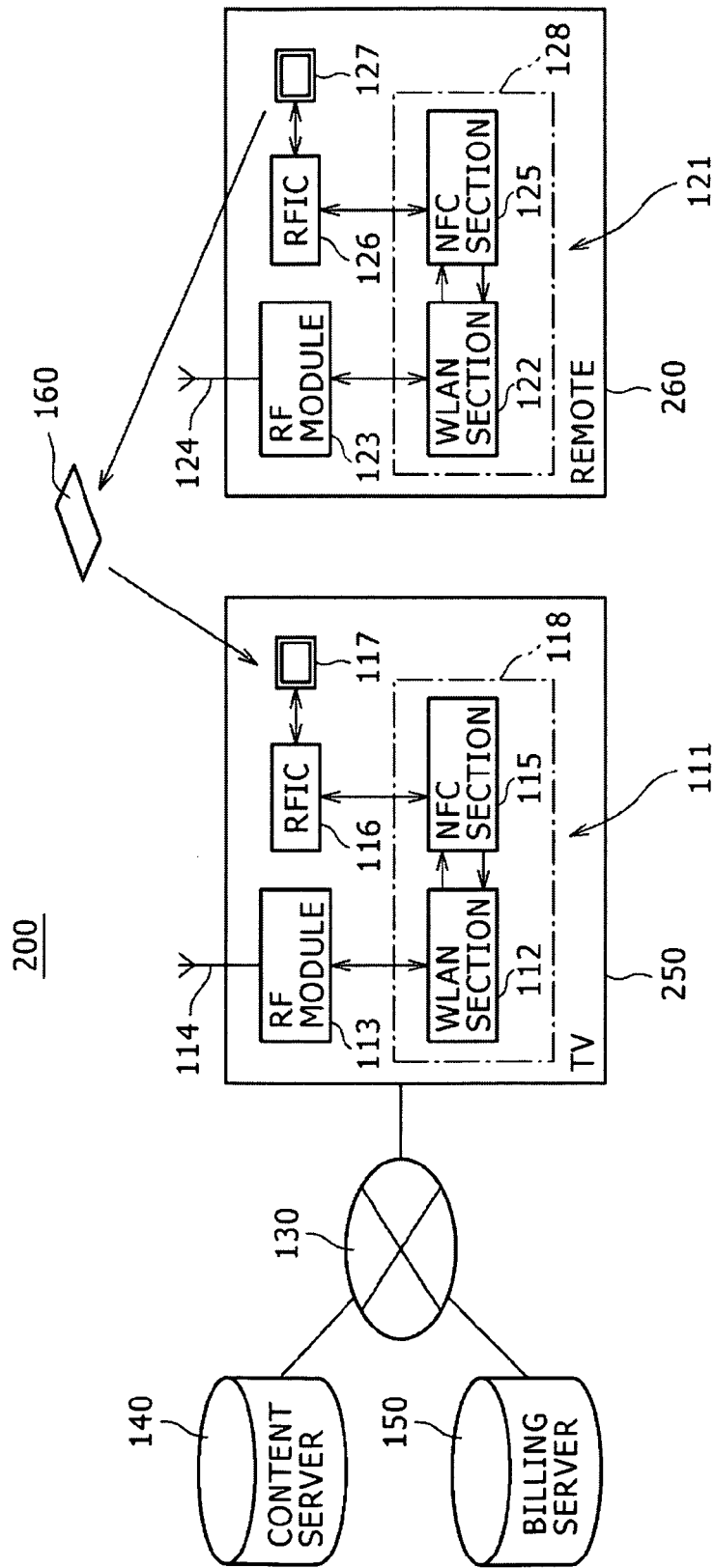
FIG. 12 is a block diagram illustrating an exemplary structure of a communication system according to another embodiment.

Next, another embodiment of the present invention will now be described below. FIG. 12 shows an exemplary structure of a communication system 200 according to another embodiment of the present invention. Note that, in FIG. 12, components that have their counterparts in FIG. 1 are assigned the same reference numerals as those of their counterparts in FIG. 1, and detailed descriptions thereof will be omitted as appropriate.

The communication system 200 includes a television receiver 250 and a remote control (hereinafter referred to as a "remote") 260. Here, the television receiver 250 forms the first wireless communication terminal, while the remote 260 forms the second wireless communication terminal.

The television receiver 250 is connected to the network 130. The content server 140 and the billing server 150 are connected to the network 130. Similar to the wireless LAN access point 110 in the communication system 100 as shown in FIG. 1 described above, the television receiver 250 includes the wireless communication section 111. In addition, similar to the television receiver 120 in the communication system 100 as shown in FIG. 1 described above, the remote 260 includes the wireless communication section 121.

In the communication system 200 as shown in FIG. 12, a setup (i.e., an initial setting) is performed for the wireless LAN section 112 in the television receiver 250 and the wireless LAN section 122 in the remote 260 to perform wireless communication therebetween. In this case, as is the case with the communication system 100 as shown in FIG. 1 described above, the setup for the wireless LAN can be performed easily and in a short time using the NFC card 160. For example, the wireless LAN section 122 of the remote 260 writes the setup information to the NFC card 160 via the NFC section 125, and the wireless LAN section 112 of the television receiver 250 takes the setup information from the NFC card 160 via the NFC section 115 to perform the setup (i.e., the initial setting).

Further, in the communication system 200 as shown in FIG. 12, as is the case with the communication system 100 as shown in FIG. 1 described above, the setting of the circuit parameter in the wireless LAN section 112 in the television receiver 250 is performed by placing the NFC card 160, to which the circuit parameter to be set has been written, near the NFC antenna 117. In this case, in response to polling by the NFC section 115, the NFC card 160 reads the circuit parameter, which has been written to the internal memory, and supplies the read circuit parameter to the NFC section 115. The NFC section 115 forwards this circuit parameter to the wireless LAN section 112. As a result, the circuit parameter is set in a predetermined register in the wireless LAN section 112.

Still further, in the communication system 200 as shown in FIG. 12, a circuit parameter for the NFC section 115 in the television receiver 250, a circuit parameter for the wireless LAN section 122 in the remote 260, a circuit parameter for the NFC section 125 in the remote 260, and so on can also be set easily in a similar manner by reading the circuit parameter from the NFC card 160 via the NFC section 115 or 125.

Figure 4:
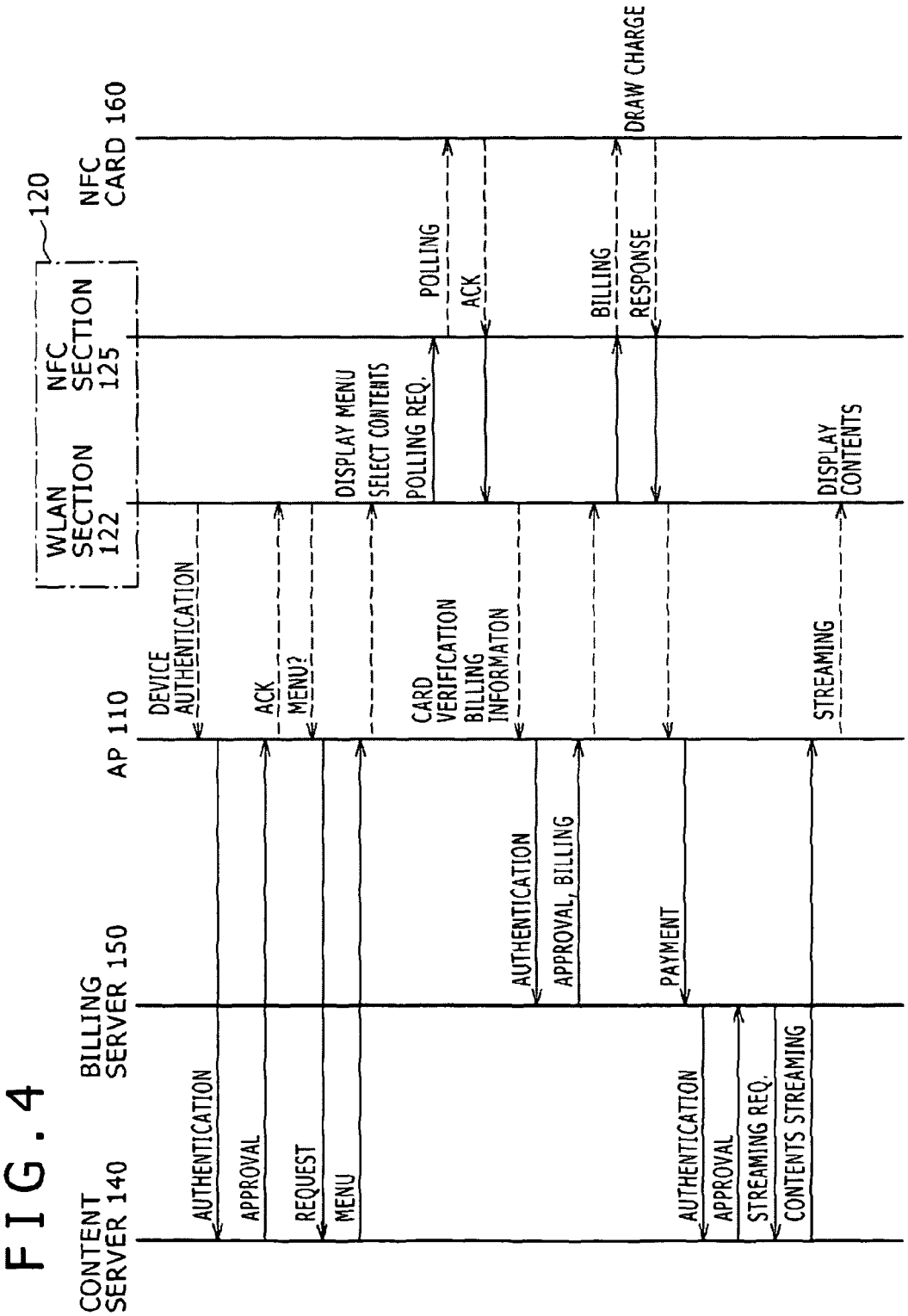
FIG. 4 is a sequence diagram for describing an operation of receiving an image content in the communication system.

An operation of receiving an image content in the communication system 200 as shown in FIG. 12 is performed in a similar manner to that of the above-described communication system 100 as shown in FIG. 1 (see FIG. 4). Note, however, that the user can use the remote 260 to operate the television receiver 250. In this case, the communication is performed between the wireless LAN section 112 in the television receiver 250 and the wireless LAN section 122 in the remote 260. Input of the billing information from the NFC card 160 can be achieved by placing the NFC card 160 near the NFC antenna 127 of the remote 260. That is, the user, who operates the remote 260, is able to perform the billing process easily near at hand.

In the communication system 200 as shown in FIG. 12, the wireless communication section 111 of the television receiver 250 and the wireless communication section 121 of the remote 260 have similar structures to those of the wireless communication section 111 in the wireless LAN access point 110 and the wireless communication section 121 in the television receiver 120, respectively, in the communication system 100 as shown in FIG. 1 described above. Therefore, the communication system 200 as shown in FIG. 12 achieves similar effects to those achieved by the communication system 100 as shown in FIG. 1.

According to an embodiment, the wireless LAN section and the NFC section, which performs short-range wireless communication, can be formed within a single chip, leading to advantages in terms of costs, power consumption and space, for example. The present application can be applied to a wireless LAN system composed of a wireless LAN access point and a television receiver, for example.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A wireless communication system, comprising:
a first wireless communication terminal; and
a second wireless communication terminal, wherein said first wireless communication terminal includes
a first wireless communication section configured to operate in a first clock system,
a first asynchronous interface, and
a second wireless communication section configured to operate in a second clock system different from the first clock system, and perform short-range wireless communication, the second wireless communication section being connected to the first wireless communication section via the first asynchronous interface, the first and second wireless communication sections being formed within a single chip,
said second wireless communication terminal includes
a third wireless communication section configured to operate in the first clock system,
a second asynchronous interface, and
a fourth wireless communication section configured to operate in the second clock system different from the first clock system, and perform short-range wireless communication, the fourth wireless communication section being connected to the third wireless communication section via the second asynchronous interface, the third and fourth wireless communication sections being formed within a single chip,
the first wireless communication section in said first wireless communication terminal outputs setup information via the second wireless communication section, and
the third wireless communication section in said second wireless communication terminal acquires the setup information outputted from the second wireless communication section in said first wireless communication terminal via the fourth wireless communication section to perform a setup based on the setup information.

2. The wireless communication system according to claim 1, wherein the second wireless communication section in said first wireless communication terminal writes the setup information, supplied from the first wireless communication section via the first asynchronous interface, to a contactless IC card, and
the fourth wireless communication section in said second wireless communication terminal reads the setup information from the contactless IC card, and supplies the read setup information to the third wireless communication section via the second asynchronous interface.

3. A wireless communication system, comprising:
a content server;
a billing server;
a network;
a first wireless communication terminal connected to said content server and said billing server via said network; and
a second wireless communication terminal connected to said first wireless communication terminal in a wireless manner, wherein
said second wireless communication terminal includes
a first wireless communication section configured to operate in a first clock system,
an asynchronous interface, and
a second wireless communication section configured to operate in a second clock system different from the first clock system, and perform short-range wireless communication, the second wireless communication section being connected to the first wireless communication section via the asynchronous interface, the first and second wireless communication sections being formed within a single chip,
content data of a specified content from said content server is supplied to said first wireless communication terminal via said network, or to the first wireless communication section in said second wireless communication terminal via said network and said first wireless communication terminal, and
billing information acquired by the second wireless communication section in said second wireless communication terminal is supplied to said billing server via the first wireless communication section, said first wireless communication terminal, and said network.

4. The wireless communication system according to claim 3, wherein the second wireless communication section in said second wireless communication terminal acquires the billing information by reading the billing information from a contactless IC card.

* * * * *